(12) United States Patent
Kraus et al.

(10) Patent No.: US 8,289,520 B2
(45) Date of Patent: Oct. 16, 2012

(54) METHOD FOR MEASURING A SPECTRUM OF A NARROWBAND LIGHT SOURCE, AND SPECTROMETER ARRANGEMENT

(75) Inventors: Johannes Kraus, Theilheim (DE); Alois Herkommer, Aalen (DE); Bernhard Weigl, Steinheim (DE); Michel Le Maire, Oberkochen (DE); Holger Muenz, Aalen (DE)

(73) Assignee: Carl Zeiss Laser Optics GmbH, Oberkochen (DE)

( * ) Notice: Subject to any disclaimer, the term of this patent is extended or adjusted under 35 U.S.C. 154(b) by 397 days.

(21) Appl. No.: 12/558,874

(22) Filed: Sep. 14, 2009

(65) Prior Publication Data

US 2010/0079765 A1    Apr. 1, 2010

Related U.S. Application Data

(60) Provisional application No. 61/101,419, filed on Sep. 30, 2008.

(30) Foreign Application Priority Data

Sep. 30, 2008  (DE) .......................... 10 2008 050 867

(51) Int. Cl.
*G01J 3/45* (2006.01)
(52) U.S. Cl. ...................................... 356/454
(58) Field of Classification Search .................. 356/454, 356/591
See application file for complete search history.

(56) References Cited

U.S. PATENT DOCUMENTS

| | | | |
|---|---|---|---|
| 5,128,798 A | 7/1992 | Bowen et al. | |
| 5,357,336 A * | 10/1994 | Ruhl et al. | 356/319 |
| 5,835,210 A | 11/1998 | Ershov | |
| 6,243,170 B1 | 6/2001 | Ershov | |
| 6,359,693 B2 | 3/2002 | Smith et al. | |
| 6,744,524 B1 * | 6/2004 | Kogan et al. | 356/519 |

(Continued)

FOREIGN PATENT DOCUMENTS

DE        698 24 021 T2        9/2004

OTHER PUBLICATIONS

Grant Fowles, Introduction to Modern Optics, 1989, Dover Publications, Second Edition, 85-91.*

*Primary Examiner* — Tarifur Chowdhury
*Assistant Examiner* — Jonathan Hansen
(74) *Attorney, Agent, or Firm* — Fish & Richardson P.C.

(57) ABSTRACT

A spectrometer arrangement for measuring a spectrum of a light beam emitted by a narrowband light source, such as a bandwidth-narrowed laser, includes at least one etalon, a beam splitter for splitting the light beam into a first partial beam and a second partial beam, one or more optical directing elements for directing the first partial beam n times and the second partial beam (n+k) times through the at least one etalon, wherein n and k are integers $\geq 1$. The spectrometer arrangement further has at least one light-sensitive detector and an evaluation device for evaluating the spectra—recorded by the at least one detector—of the first partial beam that has passed through the at least one etalon n times and of the second partial beam that has passed through the at least one etalon (n+k) times in order to determine the light spectrum corrected for the apparatus function of the at least one etalon.

27 Claims, 5 Drawing Sheets

U.S. PATENT DOCUMENTS

| | | | |
|---|---|---|---|
| 6,819,435 B2 * | 11/2004 | Arieli et al. | 356/512 |
| 7,042,579 B2 * | 5/2006 | North Morris | 356/519 |
| 7,061,946 B2 * | 6/2006 | Sochava et al. | 372/20 |
| 7,609,388 B2 * | 10/2009 | Arieli et al. | 356/512 |
| 7,633,624 B1 * | 12/2009 | Wickholm | 356/450 |
| 7,684,046 B2 * | 3/2010 | Rafac | 356/454 |
| 7,733,494 B2 * | 6/2010 | Rafac | 356/454 |
| 7,970,289 B2 * | 6/2011 | Heffner et al. | 398/202 |
| 7,990,544 B2 * | 8/2011 | Shiell et al. | 356/519 |
| 7,991,300 B2 * | 8/2011 | Heffner et al. | 398/202 |
| 2001/0013933 A1 * | 8/2001 | Smith et al. | 356/454 |
| 2004/0091001 A1 * | 5/2004 | Sochava et al. | 372/20 |

* cited by examiner

METHOD FOR MEASURING A SPECTRUM OF A NARROWBAND LIGHT SOURCE, AND SPECTROMETER ARRANGEMENT

CROSS REFERENCE TO RELATED APPLICATIONS

This application claims priority under 35 U.S.C. §119(e)(1) to U.S. Application No. 61/101,419, filed Sep. 30, 2008. This applications also claims priority under 35 U.S.C. §119 to German Application No. 10 2008 050 867.5, filed on Sep. 30, 2008. The contents of both of these applications are hereby incorporated by reference in its entirety.

FIELD

The disclosure relates to a method for measuring a spectrum of a narrowband light source, such as a bandwidth-narrowed laser. The disclosure also relates to a spectrometer arrangement for measuring a spectrum of a narrowband light source, such as a band-width-narrowed laser.

BACKGROUND

The measurement of spectra of narrowband light sources often can involve the use of high-resolution spectrometers based either on the use of large gratings or on the use of etalons. The use of gratings can involve correspondingly large optical assemblies and a corresponding structural space, while etalons are limited in terms of the measurement range.

SUMMARY OF THE DISCLOSURE

In some embodiments, the disclosure provides a method for measuring a spectrum of a narrowband light source, such as a bandwidth-narrowed laser, and also a spectrometer arrangement for carrying out the measurement, by use of which method and spectrometer arrangement the spectrum can be measured with high resolution, while the spectrometer arrangement itself should be as compact as possible.

According to the disclosure, a method for measuring a spectrum of a narrowband light source is provided, including the following steps:

directing a light beam emitted by the light source through at least one etalon, wherein the light beam is split into a first partial beam and a second partial beam and the first partial beam is directed n times and the second partial beam (n+k) times through the at least one etalon, wherein n and k are integers $\geq 1$;

directing the first partial beam that has passed through the at least one etalon n times and the second partial beam that has passed through the at least one etalon (n+k) times onto at least one detector area of at least one light-sensitive detector;

evaluating the spectra—recorded by the at least one detector—of the first partial beam that has passed through the at least one etalon n times and of the second partial beam that has passed through the at least one etalon (n+k) times in order to determine the light spectrum corrected for the apparatus function of the at least one etalon.

According to another aspect of the disclosure, a spectrometer arrangement for measuring a spectrum of a narrowband light source is provided, including:

at least one etalon;

a beam splitter for splitting the light beam into a first partial beam and a second partial beam;

one or more optical directing elements for directing the first partial beam n times and the second partial beam (n+k) times through the at least one etalon, wherein n and k are integers $\geq 1$;

at least one light-sensitive detector;

an evaluation device for evaluating the spectra—recorded by the at least one detector—of the first partial beam that has passed through the at least one etalon n times and of the second partial beam that has passed through the at least one etalon (n+k) times in order to determine the light spectrum corrected for the apparatus function of the at least one etalon.

The method according to the disclosure and the spectrometer arrangement according to the disclosure are based on the concept of permitting the light emitted by the light source to pass through the at least one etalon both n times and (n+k) times and of simultaneously measuring the spectrum after n-fold and (n+k)-fold passage through the at least one etalon. Consequently, two spectra are recorded simultaneously, of which one is convolved with the n-fold transmission function of the at least one etalon and the other is convolved with the (n+k)-fold of the transmission function. In the case of the method according to the disclosure and the spectrometer arrangement according to the disclosure, only one etalon arrangement is involved, whereby the spectrometer arrangement according to the disclosure is embodied in compact fashion and involves little structural space and also little adjustment outlay.

An "etalon" for the purposes of the present disclosure should generally be understood to mean a pair of optical surfaces between which multiple reflections can take place. Two mutually facing surfaces of plates between which an air clearance is present, or the two surfaces of a single plate can be an etalon in this case. The reflective surfaces forming an etalon can be parallel or inclined with respect to one another. In the case where an etalon is constructed from a plurality of plates, the distance between the plates can be tunable or fixed. All designs of etalons are appropriate for the present disclosure.

One particular advantage of the method according to the disclosure and of the spectrometer arrangement according to the disclosure consists in the simpler evaluation of the spectrum to be measured. This is because, instead of a deconvolution, the method according to the disclosure and the arrangement according to the disclosure make it possible to use a test function for describing the apparatus or transmission function of the at least one etalon, which, by way of example, is convolved once with the spectrum after (n+k)-fold passage through the at least one etalon and is convolved (k+1) times with the spectrum after single passage through the at least one etalon. By setting free parameters of the test function, the latter can be adapted in such a way that the two convolution products mentioned above are substantially identical, that is to say that the same spectral functions result. The true spectrum to be measured then results from the deconvolution of the convolution product from said test function.

In some configurations, the second partial beam is directed through the at least one etalon once more than the first partial beam, i.e. k=1 in this case. In this case, the first partial beam is directed n times through the at least one etalon, and the second partial beam (n+1) times.

It is furthermore optional for the first partial beam is directed once through the at least one etalon (n=1), and the second partial beam twice (n=1, k=1), wherein the spectrometer arrangement can be realized in a very simple manner.

In the latter case, the light beam coming from the light source can be split into the first partial beam and the second partial beam after passing through the at least one etalon, and the second partial beam is directed back through the at least one etalon. The first partial beam is then directed onto the detector without further passage through the at least one etalon, and the second partial beam is correspondingly directed onto the detector after passing through the at least one etalon twice.

For the purposes of the present disclosure, the simultaneous recording of the spectrum after n-fold and (n–k)-fold passage through the at least one etalon can be recorded by the same detector or by two separate detectors. All that is important is that a spectrum is measured simultaneously after n-fold and (n+k)-fold passage through the at least one etalon. It is optional, however, both in the method and in the spectrometer arrangement, for only one detector to be present and for the first partial beam and the second partial beam to be directed onto said detector.

This measure is advantageous for the purpose of a particularly compact design of the spectrometer arrangement and, with regard to the method for measuring a spectrum, has the advantage of a more precise evaluation of the spectrum because it is not necessary to take account of differences in the detector sensitivity when a plurality of detectors are used.

In this connection it is possible for the first partial beam and the second partial beam are directed onto different regions of a detector area of the detector.

This measure makes it possible to record both spectra, i.e. the spectrum after n-fold passage through the etalon and after (n+k)-fold passage through the at least one etalon, separately but simultaneously using the same detector.

In this case, it is furthermore possible for the first partial beam and the second partial beam are directed onto the detector area of the detector in a manner offset with respect to one another in a first area direction of the detector area, and with the same extent in a second area direction of the detector area.

In the case of the spectrometer arrangement, in this case, optionally, a beam expanding element is arranged in the beam path of the second partial beam and a beam expanding element, for example at least one prism, is arranged in the beam path of the first partial beam, in order to direct both partial beams onto the detector area with the same extent in one dimension of said detector area.

This measure also contributes to a simpler evaluation of the spectrum to be measured, because, in particular in connection with the test function described above, a direct comparison of the two spectra after n-fold and (n+k)-fold passage through the at least one etalon and the adaptation of the free parameters of the test function are made possible.

In the case of the method according to the disclosure and the spectrometer arrangement according to the disclosure, the at least one etalon has a wedge error, such that a spectral range of at least twice the free spectral range (FSR) appears on the detector area.

In this case, it is advantageous that the spectral line to be measured can be clearly separated with its primary maximum from its secondary maxima.

In some configurations of the method and of the spectrometer arrangement, the at least one etalon is constructed from two plane plates, or at least two etalons are present which are constructed from two wedges, wherein, in the latter case, the two wedges are oriented with their wedge directions offset optionally by 90° with respect to one another.

The use of two etalons each made from a wedge, wherein the two wedges are oriented with their wedge directions offset in particular by 90° with respect to one another, has the advantage that it is not necessary to effect a tuning of the etalons, as is the case for an etalon constructed from two plates. The two wedges can have a different free spectral range. The common tuning of the plates of an etalon constructed from two plane plates is replaced in the case of wedges by the choice of the locations having the respectively corresponding thickness on both wedge plates. The advantage of wedge plates therefore consists in the fact that no elements have to be moved. If the wedge plates are oriented in crossed directions, as is provided in some configurations, the evaluation of a diagonal line on the detector corresponds to the common tuning It goes without saying, however, that the two wedge plates do not have to be arranged in crossed fashion, but rather can be oriented in parallel fashion, in which case care should then be taken to ensure that the wedge angles and thicknesses of the two wedge plates are in the correct ratio with respect to one another.

As already mentioned above, the step of evaluating the spectra of the first partial beam and of the second partial beam can have the following step: convolving the spectrum of the first partial beam with the (k+1)-th power of a test function approximately describing the apparatus function of the at least one etalon, and convolving the spectrum of the second partial beam with the same test function, and minimizing the mean square deviation between the resultant convolution products by changing at least one free parameter of the test function.

Since the apparatus or transmission function of etalons is subject to the influence of geometrical faults and lateral variations of the reflectivities of the layers and cannot be described by an ideal function that can be derived from the physical process, this measure has the advantage that the apparatus function can be approximated iteratively by a test function. This is made possible by the configuration of the method according to the disclosure, namely that the spectrum is measured both after n-fold and after (n+k)-fold passage through the at least one etalon. In the case of a convolution of the spectrum after n-fold passage with the (k+1)-th power of the test function and the spectrum after (n+k)-fold passage with the test function itself, it is possible to adjust the parameters of the test function until both convolution products are identical, or until the mean square deviation between the convolution products is minimal or even zero.

Optionally, the process of changing the at least one free parameter is carried out iteratively in a plurality of evaluation cycles.

Advantageously, the test function can be stored after the measurement of a spectrum, such that in the case of a renewed measurement of a spectrum of a different light source, the changes in the apparatus or transmission function that arise for example as a result of changes in the etalon or etalons can be found very rapidly by adjusting the free parameters of the test function in very few iteration steps.

Optionally, the chosen test function is determined before adjusting the at least one free parameter on the basis of the evaluation of known spectra having a different line width but the same central wavelength.

In this way, the suitability of the test function assumed can be checked with high accuracy, namely by virtue of the fact that input spectra having different widths but the same central wavelength have to lead to virtually identical apparatus functions and the deconvolution of the spectra after single passage and double passage with the aid of the derived apparatus function should yield as far as possible matching values for $\Delta\lambda_{FWHM}$ and $\Delta\lambda_{95\%}$.

When determining the free parameters of the test function, the quality that can be achieved is not determined by the individual evaluation of a spectrum pair of the spectra after n-fold and (n+k)-fold passage through the at least one etalon, but rather can be increased with each evaluation cycle.

Despite finite physical resolution, the effective resolution can be increased virtually to zero with the aid of the method according to the disclosure.

In the case of the spectrometer arrangement according to the disclosure, the beam splitter and the directing element or directing elements can be jointly formed by a partly transmissive mirror.

This measure furthermore contributes to the simplification and, in particular, more compact design of the spectrometer arrangement, because the splitting of the light beam into two partial beams and the directing of the two partial beams for single or multiple passage through the at least one etalon are realized by one optical component.

In this connection, it is furthermore possible for the partly transmissive mirror is oriented in relation to the at least one etalon in such a way that the partial beams pass through the at least one etalon in at least approximately complete superimposition with respect to one another.

In this case, it is advantageous that the partial beams which pass through the at least one etalon pass through the at least one etalon at the same location. Faults in the etalon or etalons, for example different reflectivities along the surface of the etalon or etalons or figure errors do not adversely affect the measurement of the spectrum as a result.

In some configurations of the spectrometer arrangement, the at least one etalon is slightly tilted in relation to the light beam.

In this case, it is advantageous that reflections of the light beam prior to the first passage through the at least one etalon cannot reach the detector, but rather can be nullified in a light trap. A corruption or disturbance of the measurement of the spectrum of the light from the light source is thus avoided.

Further advantages and features emerge from the following description and the accompanying drawing.

It goes without saying that the features mentioned above can be used not only in the combination respectively specified, but also in other combinations or by themselves, without departing from the scope of the present disclosure.

BRIEF DESCRIPTION OF THE DRAWINGS

Exemplary embodiments of the disclosure are illustrated in the drawing and are explained in greater detail in the following description. In the figures.

DETAILED DESCRIPTION

Figure 1:
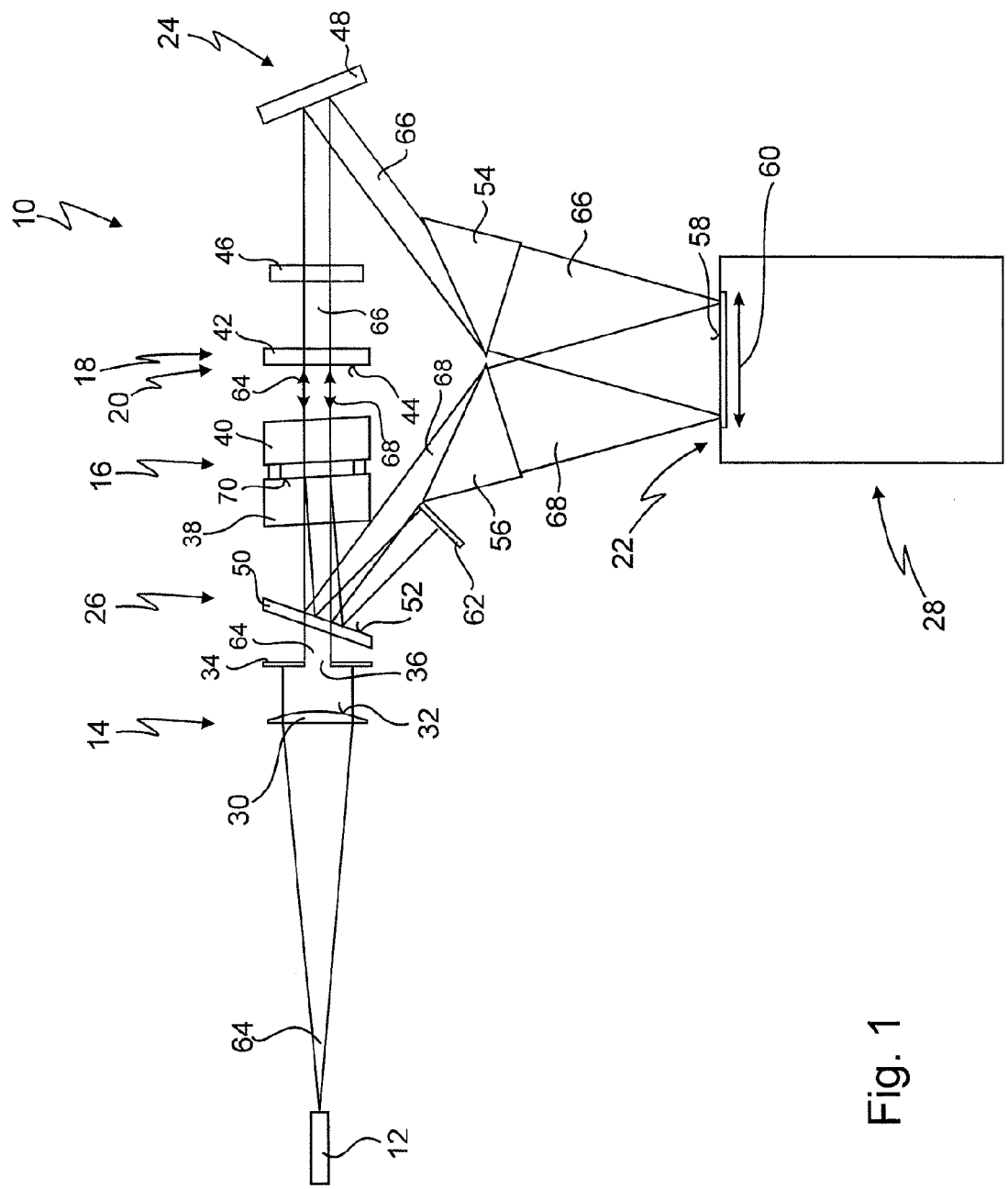
FIG. 1 shows a spectrometer arrangement for measuring a spectrum of a narrow-band light source in accordance with a first exemplary embodiment.

FIG. 1 illustrates a spectrometer arrangement for measuring a spectrum of a narrowband light source 12, said spectrometer arrangement being provided with the general reference symbol 10. The light source 12 is in particular a bandwidth-narrowed laser, for example a bandwidth-narrowed excimer laser. The light emitted by the light source 12 can also be fed to the spectrometer arrangement 10 via a fibre.

Without restricting the generality, the spectrometer arrangement 10 is designed to measure the light emitted by the light source 12 after single and simultaneously after double passage through at least one etalon, that is to say that, in the exemplary embodiment shown, the following can hold true for the parameters n and k: n=1, k=1. The spectrometer arrangement 10 generally has a collimator 14, an etalon 16, a beam splitter 18, an optical directing element 20, a light-sensitive detector 22, furthermore, a first optical directing element 24 and a second optical directing element 26 and also an evaluation device 28.

In the exemplary embodiment, the collimator 14 is embodied as a planoconvex lens 30, the convex surface 32 of which has a radius of curvature of 500 mm, for example. Disposed downstream of the collimator 14 is a pinhole diaphragm 34, the through opening 36 of which determines the aperture of the spectrometer arrangement 10. The aperture is small relative to the width of the light beam upstream of the pinhole diaphragm.

In the exemplary embodiment shown, the etalon 16 has two plates 38 and 40 embodied as plane-parallel plates. However, the plates 38 and 40 can also be embodied in wedge-type fashion.

In the exemplary embodiment shown, the beam splitter 18 and the directing element 20 are formed by a single optical element embodied in the form of a plate 42. A surface 44 of the plate 42 is embodied as a partly transmissive mirror; by way of example, the surface 44 has a reflectivity of 95%. This means that the plate 42 transmits one portion of the light and reflects another portion back.

An attenuator 46 is arranged downstream of the plate 42 as seen in the direction of light propagation.

The first optical directing element 24 is embodied as a mirror 48, the reflectivity of which can approach 100%. The mirror 48 is tilted relative to the direction of light propagation of the incident light, in order to deflect the incident light.

The second optical directing element 26 is embodied in the form of a plate 50, a surface 52 of which is partly mirrored, wherein the reflectivity of the surface 52 is approximately 30%, by way of example. The plate 50 or the surface 52 is tilted relative to the direction of propagation of the light incident on the surface 52. A beam expanding element 54 and 56 is disposed downstream of the first optical directing element 24 and the second optical directing element 26, respectively, as seen in the direction of light propagation. In the exemplary embodiment shown, the beam expanding elements 54 and 56 are embodied as prisms.

The detector 22 has a detector area 58, which is embodied as a two-dimensional CCD sensor and which has an extent in a first area direction 60 and a second area direction, which is directed perpendicular to the plane of the drawing in FIG. 1.

The spectrometer arrangement 10 furthermore has a light trap 62.

The evaluation device 28 has evaluation electronics (not illustrated in greater detail).

Firstly, a method for measuring a spectrum of the light source 12 is described below.

A light beam 64 coming from the light source 12 and having a certain divergence is firstly collimated by means of the collimator 14. The light beam 64 then passes further through the pinhole diaphragm 34, in order to delimit the light beam 64 marginally. The light beam 64 passes further through the plate 50 and is directed through the etalon 16. In the etalon 16 (plates 38, 40), multiple reflections take place, which lead to constructive and destructive interferences downstream of the etalon 16. After the light beam 64 has passed through the etalon 16, the light beam 64 impinges on the beam splitter 18, whereby the light beam 64 is split into a first partial beam 66 and a second partial beam 68. This is done by virtue of the light beam 64 impinging on the plate 42 embodied as a partly transmissive mirror.

The first partial beam 66, which has therefore passed once through the etalon 16, passes through the attenuator 46 and is directed in the direction of the detector 22 by the first optical directing element 24, the first partial beam 66 being expanded by the beam expanding element 54. The first partial beam 66 is then incident on the detector area 58 of the detector 22.

The second partial beam 68 is directed back through the etalon 16 by the directing element 20, likewise formed by the plate 42. The second partial beam 68 therefore passes through the etalon 16 a second time and impinges on the second optical directing element 26 in the form of the partly mirrored plate 50. From there, the second partial beam 68 is likewise directed towards the detector area 58 of the detector 22, the second partial beam 68 being expanded by means of the beam expanding element 56 on the path from the second optical directing element 26 to the detector 22.

The plate 38 of the etalon 16 is slightly tilted relative to the light beam 64 incident for the first time, such that direct retroreflections, for example at a surface 70 of the plate 38, cannot pass to the detector 22, but rather are intercepted or nullified by the light trap 62.

Consequently, the first partial beam 66, which has passed through the etalon 16 once (n=1), and the second partial beam 68, which has passed through the etalon 16 twice (n+k=2), are incident on the detector area 58 of the detector 22.

In this case, the first partial beam 66 and the second partial beam 68 are directed onto different regions of the detector area 58 of the detector 22. For this purpose, the first partial beam 66 and the second partial beam 68 are directed onto the detector area 58 in a manner offset relative to one another for example by means of a corresponding orientation of the second optical directing element 26 in the direction perpendicular to the area direction 60 (perpendicular to the plane of the drawing in FIG. 1).

On the detector area 58, therefore, a spectrum of the light emitted by the light source 12 after single passage through the etalon 16 and after double passage through the etalon 16 are recorded with the same extent in the direction of the area direction 60 but in a manner offset relative to one another perpendicular to said direction.

In this case, the etalon 16 has a wedge error, such that a spectral range of at least twice the free spectral range (FSR) of the etalon 16 appears on the detector area 58.

Consequently, the spectrum of the light emitted by the light source 12 after single passage through the etalon 16 and after double passage through the etalon 16 is recorded simultaneously by means of the spectrometer arrangement 10.

The "true" spectrum to be measured of the light emitted by the light source 12 is determined in the evaluation device 28 as follows.

The spectrum (partial beam 66) recorded after single passage through the etalon 16 is the "true" spectrum convolved with the apparatus or transmission function of the etalon 16. The spectrum after double passage through the etalon 16 (partial beam 68) is the "true" spectrum convolved with the square of the apparatus or transmission function. Since the apparatus function cannot be described by an ideal function that can be derived from the physical process, a test function which approximately describes the apparatus function of the etalon 16 is employed. Such a test function can be a Gauβ-Lorenz function, for example, which can describe a possible asymmetry of the apparatus function. The test function can be constituted such that it has at least one, optionally a plurality of free parameters which can be altered.

The spectrum of the first partial beam 66 is then convolved with the square (generally with the (k+1)-th power) of said test function, and the spectrum of the second partial beam 68 is convolved with the test function itself. The at least one free parameter of the test function is adjusted until the mean square deviation between the convolution products described above becomes minimal. As soon as the convolution products are at least approximately identical after adjusting the at least one free parameter, the spectrum after single passage through the etalon 16 (partial beam 66), recorded by means of the detector 22, can then be deconvolved by solving a linear integral equation, that is to say that it is not necessary to solve integral equations for the square of the apparatus function in order for example to deconvolve the spectrum after double passage through the etalon 16. The deconvolution is carried out by means of the test function determined in the manner described above.

The suitability of the test function employed can be checked by virtue of the fact that input spectra having different widths (but having the same central wavelength) desirably leads to virtually identical apparatus functions and the deconvolution of the spectra after single passage and after double passage through the etalon with the aid of the derived apparatus function should yield as far as possible matching values for $\Delta\lambda_{FWHM}$ and $\Delta\lambda_{95\%}$.

The adaptation of the at least one free parameter of the test function is optionally carried out iteratively in a plurality of evaluation cycles.

The method and the spectrometer arrangement 10 can react to variations in the resolution which result for example from a change in the reflectivities of the plates 38 and 40 of the etalon 16 under the influence of the light radiation (in particular UV radiation during the measurement of spectra of excimer lasers) or from the dependence of the resolution on the position of the central wavelength (on account of lateral inhomogeneities of the etalon properties).

Figure 2:
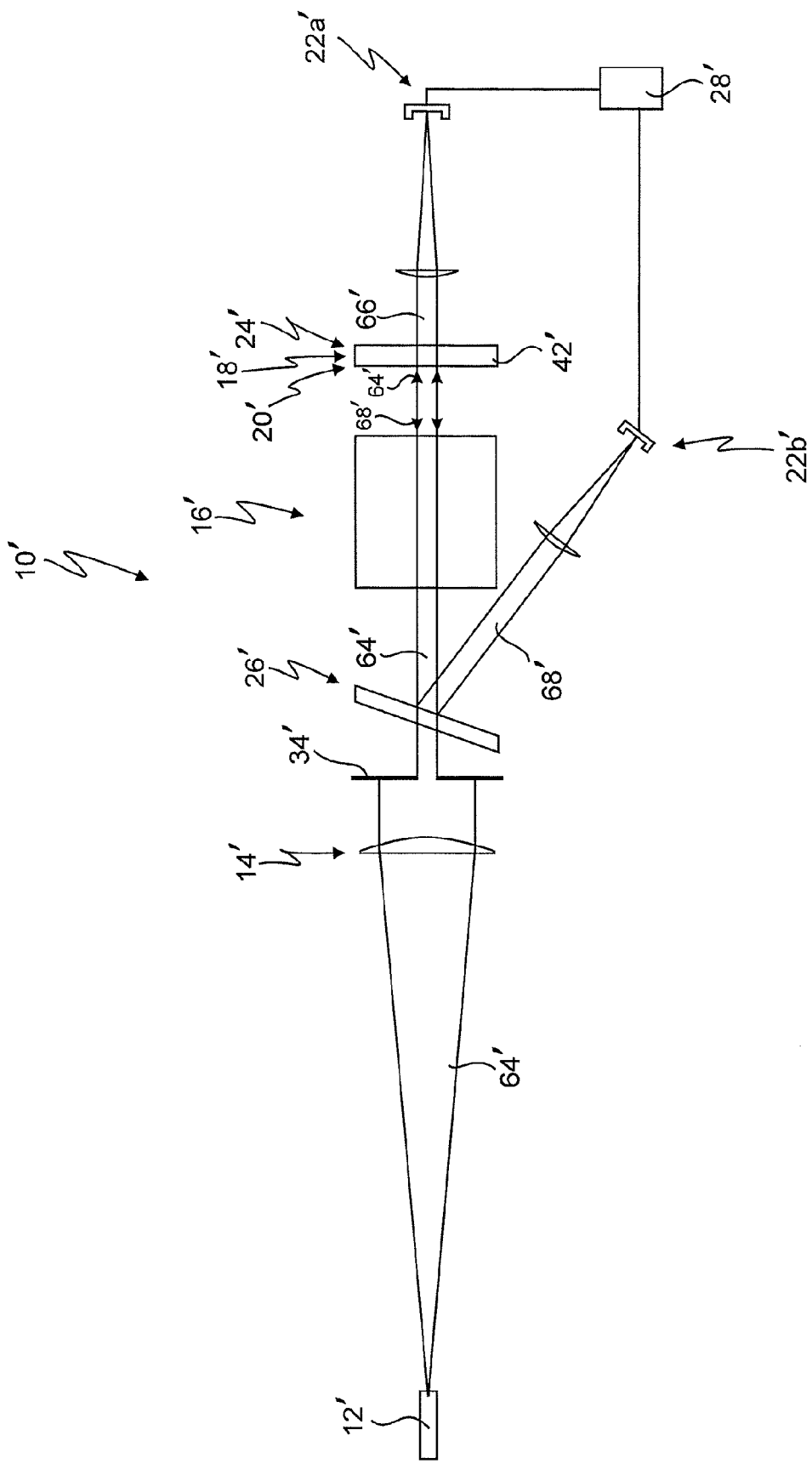
FIG. 2 shows a spectrometer arrangement for measuring a spectrum of a narrow-band light source in accordance with a second exemplary embodiment.

FIG. 2 illustrates a second exemplary embodiment of a spectrometer arrangement 10', wherein, for identical or comparable parts, the same reference symbols supplemented by a ' are used for the spectrometer arrangement 10'. Only the differences between the spectrometer arrangement 10' and the spectrometer arrangement 10 will be described below. The spectrometer arrangement 10', too, is designed here for measuring the spectrum after single and double passage of the light through the etalon 16'.

The spectrometer arrangement 10' has two detectors 22a' and 22b', wherein the spectrum of the first partial beam 66' after single passage through the etalon 16' is recorded by means of the detector 22a' while the spectrum of the second partial beam 68' after double passage through the etalon 16' is recorded by means of the detector 22b'.

The etalon 16', which is only illustrated schematically in FIG. 2, can be constructed from two plane-parallel or wedge-shaped plates, the distance between which is fixed, while the etalon 16' is rotatable. The measurement of the spectrum is then carried out during rotation of the etalon 16' by means of the detectors 22a' and 22b', which are embodied as point detectors.

In the case of the spectrometer arrangement 10', the plate 42' forms the beam splitter 18' for splitting the light beam 64' that has passed through the etalon 16' into the first partial beam 66' and the second partial beam 68', the optical directing element 20' for directing the second partial beam 68' back through the etalon 16' and the first optical directing element 24' for directing the first partial beam 66' that has passed once through the etalon 16' onto the detector 22a'.

Whereas both in the case of the spectrometer arrangement 10 and in the case of the spectrometer arrangement 10' the optical directing element 20' is oriented such that the light beam 64' and the second partial beam 68' completely overlap in the etalon 16', that is to say have no offset with respect to one another transversely with respect to the direction of light propagation, consideration can likewise be given to varying, by means of slightly tilting the directing element 20 and 20', respectively, the overlap of the light beam 64' with the second partial beam 68' in the etalon, such that a multiplicity of pairs of spectra after single and double passage through the etalon 16 and 16' can be recorded, in the case of which the variation of the spectra after single and double passage through the etalon 16 and 16' is ideally only determined by the offset of the transmission curves of outgoing and return pass.

While the detector 22' has a two-dimensional detector area, the detectors 22a' and 22b' can be detectors for single-channel operation, wherein the spectra after single and double passage through the etalon 16' are then measured by rotation of the etalon 16'. In single-channel operation there is the advantage that the useful region of the etalon 16' can be restricted to a greater extent by the pinhole diaphragm 34', whereby the desired properties of the homogeneity of the plate spacing of the etalon 16' are less stringent.

In the case of the spectrometer arrangement 10 having an areal detector 22, by contrast, the spectra after single and double passage through the etalon 16 can be measured by a linear variation of the distance between the plates 38 and 40 in multichannel operation.

Figure 3:
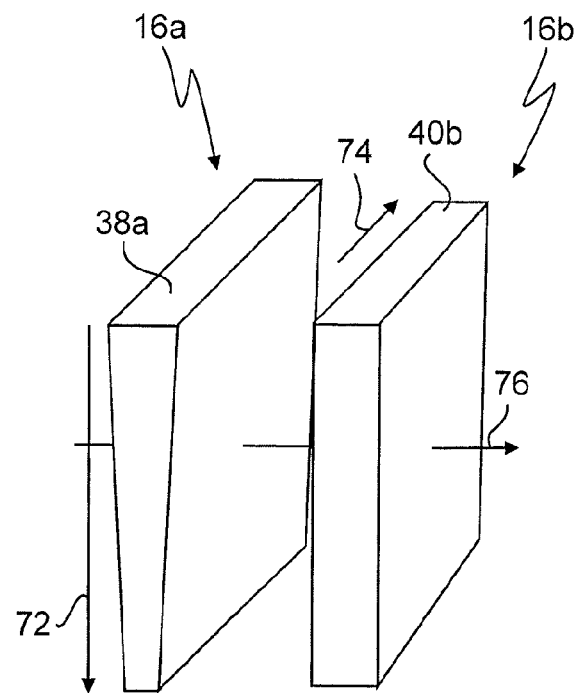
FIG. 3 shows two etalons, each constructed from a wedge plate, for alternative use in the spectrometer arrangement in FIG. 1 or in FIG. 2.

FIG. 3 illustrates two etalons 16a and 16b, which can be used instead of the etalon 16 in FIG. 1. The etalon 16a has a plate 38a and the etalon 16b has a plate 40b, each of said plates being configured as a wedge plate.

In accordance with FIG. 3, the plate 38a has a tapering (wedge direction) in the direction of an arrow 72, and the plate 40b has a tapering (wedge direction) in the direction of an arrow 74. An arrow 76 indicates the direction of the light propagation through the etalons 16a, 16b. In the exemplary embodiment in accordance with FIG. 3, the two plates 38a and 40b of the etalons 16a, 16b are arranged such that their wedge directions (arrows 72 and 74) are perpendicular to one another.

The plates 38a and 40b furthermore have a different free spectral range (FSR).

In the case of an etalon constructed from two plane-parallel plates each having a different free spectral range (FSR), a large measurement range is achieved in conjunction with good resolution. In the case of an etalon constructed from two plane-parallel plates, the thickness of the two plates is simultaneously coordinated such that the transmission maxima at a specific wavelength coincide, and then the thickness of the two plates is tuned such that the common transmission maximum is shifted in order to scan the spectrum. In this case, the coinciding of the transmission maximum has to be ensured by suitable calibration. The combined transmission function of the two plates has the narrow full width at half maximum of the "finer" plate and the free spectral range of the "coarse" plate.

Figure 4:
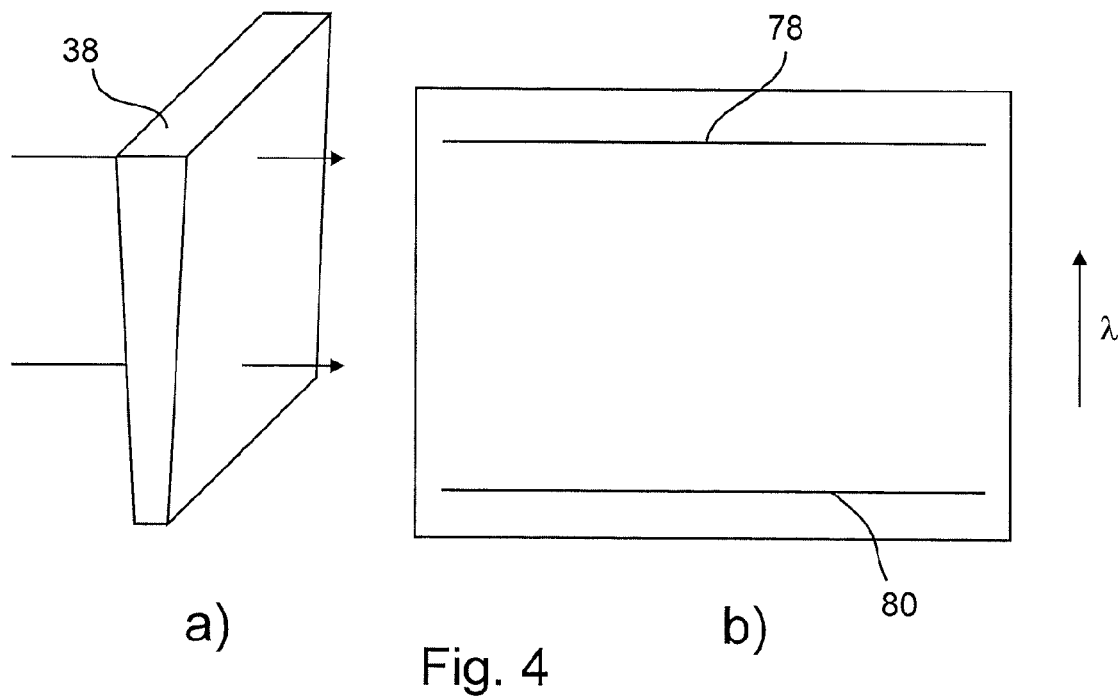
FIGS. 4a) and 4b) show a first wedge plate of the etalons in FIG. 3 (FIG. 4a)) and an interference fringe pattern (FIG. 4b)) produced by the wedge plate in accordance with FIG. 4a)
Figure 5:
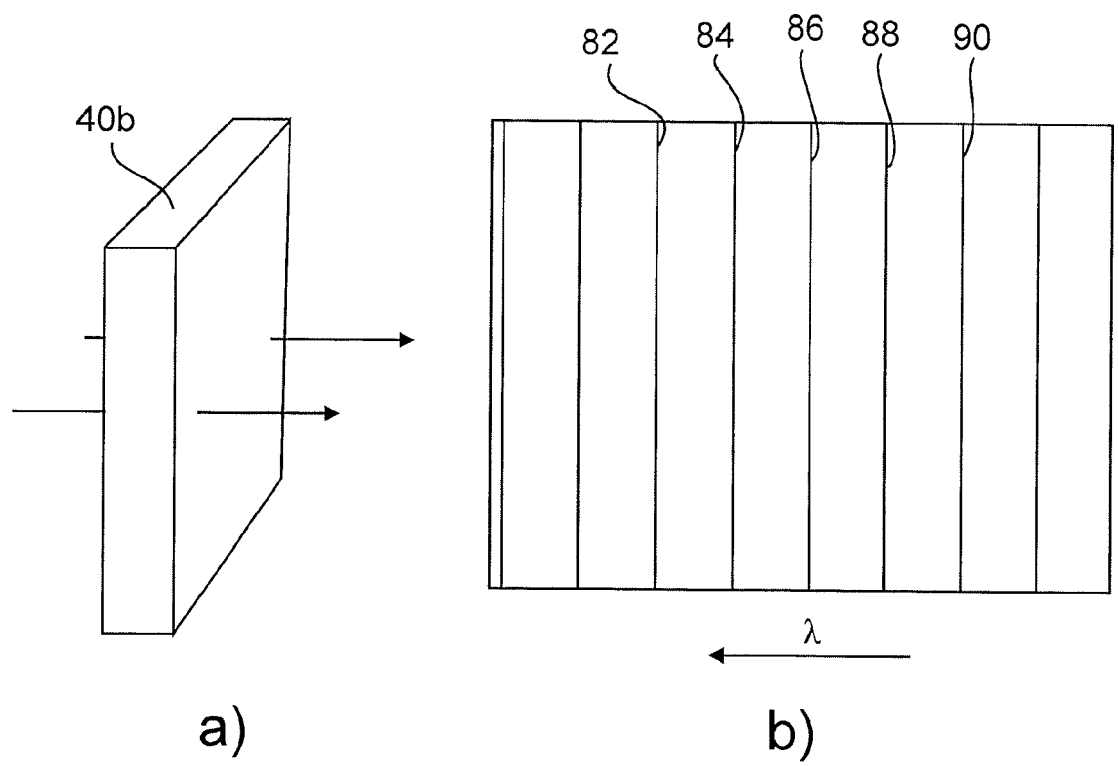
FIGS. 5a) and 5b) show a second wedge plate (FIG. 5a)) of the etalons in FIG. 3 and an interference fringe pattern (FIG. 5b)) produced by this wedge plate.

In the case of the etalons 16a, 16b, which are respectively constructed from a crossed wedge-shaped plate 38a, 40b each having a different free spectral range, the same principle is advantageously realized without the tuning of the two plates. This is described below with reference to FIGS. 4 to 6.

FIG. 4a) shows the wedge-shaped plate 38a of the etalon 16a by itself. The plate 38a has a large free spectral range by comparison with the plate 40b, for example 20 pm. The plate 38a transmits a specific wavelength λ only at horizontal interference fringes 78, 80 having a spacing of the free spectral range, that is to say here 20 pm, for example.

FIG. 5a) shows the second wedge-shaped plate 40b of the etalon 16b by itself, the plate 40b having a free spectral range that is smaller than the free spectral range of the plate 38a. The free spectral range of the plate 40b is 3 pm, for example. In the orientation in accordance with FIG. 5a), the plate 40b transmits a specific wavelength λ only at vertical interference fringes 82 to 90 having a spacing from one another of the free spectral range, that is to say here 3 pm, for example.

Both plates 38a and 40b together transmit, in their arrangement arranged one after another in accordance with FIG. 3, a specific wavelength λ only at the points of intersection of the interference fringes 78, 80 with the interference fringes 82 to 90, at which the transmission maxima therefore coincide. This is illustrated in FIG. 6.

Figure 6:
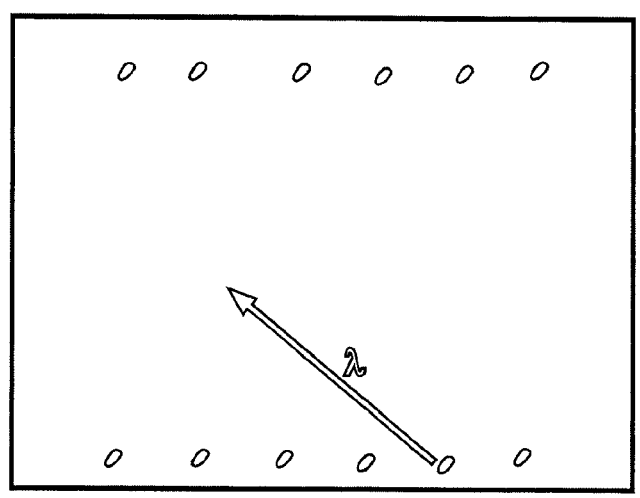
FIG. 6 shows an interference fringe pattern of light after passage through the etalons in FIG. 3.

In accordance with FIG. 6, the transmission maxima coincide at the points of maximum intensity of the two plates 38a and 40b. In contrast to tunable etalons constructed from plane-parallel plates without a wedge, no prior calibration is necessary.

The evaluation of the point pattern in accordance with FIG. 6 is effected in the direction in which the thickness of the two plates 38a and 40b increases or decreases, and not perpendicularly thereto, in order that the detuning of the two plates 38a, 40b is effected with the same sign. The precise direction of the evaluation results from the condition that the transmission maxima are furthermore intended to coincide, that is to say that the change in thickness desirably is proportional to the thickness of the two plates 38a, 40b, themselves. If the ratio of the plate thicknesses or of the free spectral ranges is an integer, the precise direction can be determined by "counting" the maxima in both axes.

Figure 7:
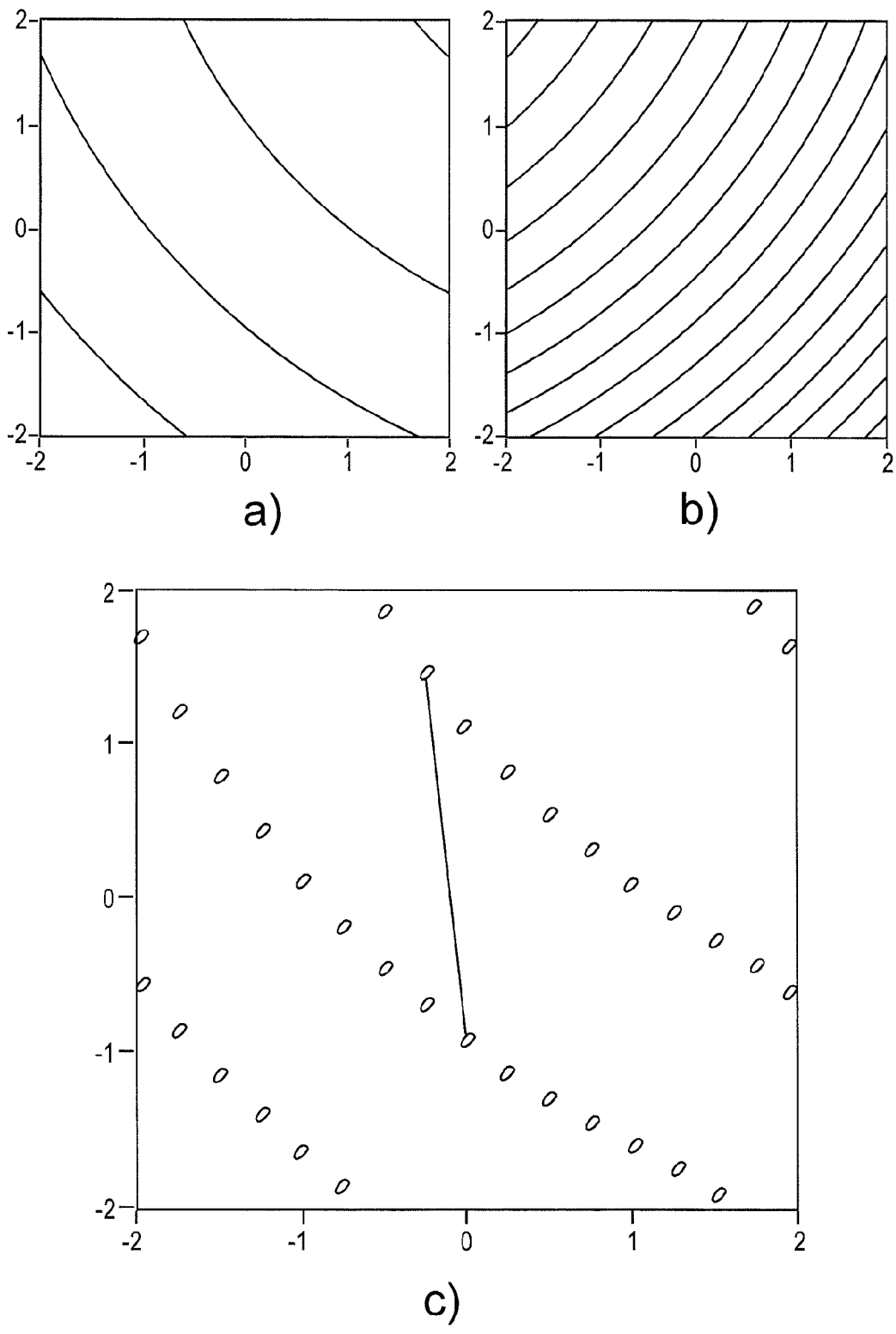
FIGS. 7a) to 7c) show interference fringe patterns produced by two etalons, each constructed from a plane-parallel plate tilted relative to the optical axis.

The etalon 16 in FIG. 1 can also be constructed from plane-parallel plates tilted relative to the direction of light propagation. In this case, too, one plate has a large free spectral range and the other plate has a small free spectral range. Since the light passing through the two plates has a certain angular divergence, the interference patterns after passage through the first plane-parallel plate having a large free spectral range include rings having a spacing corresponding to the free spectral range of said plate (cf. FIG. 7a), and when the light passes through the second plane-parallel plate by itself, a ring pattern as illustrated in FIG. 7b) arises, wherein the spacings of the rings in accordance with the smaller free spectral range, are smaller than in the case of the abovementioned plate. After the light has passed through both plane-parallel plates arranged one after another, a point pattern as illustrated in FIG. 7c) arises. If a corresponding section is placed into the point image, then this section is generally not a straight line as in the case of the wedge-shaped plates described above, but rather a segment of a hyperbola-like function.

In the case where the etalon 16 is constructed from plane-parallel plates, the light beam can be directed through the etalon instead of being collimated with an angular spectrum.

The construction of the etalons 16a, 16b with wedge-shaped plates 38a and 40b involves a beam that is collimated as well as possible, for which purpose the collimator 14 and 14' is provided in the spectrometer arrangements 10 and 10', respectively. This is because, firstly, the transmission curve of the etalon or etalons is shifted to other values in the case of oblique passage and, secondly, the light beams run in slightly different directions after passing through the etalon or etalons.

What is claimed is:

1. A method, comprising:

directing a light beam emitted by a narrowband light source through at least one etalon, the light beam being split into a first partial beam and a second partial beam, the first partial beam being directed n times through at least one etalon, the second partial beam being directed (n+k) times through the at least one etalon, n and k being integers $\geq 1$;

directing the first partial beam that has passed through the at least one etalon n times and the second partial beam that has passed through the at least one etalon (n+k) times onto at least one light-sensitive detector; and evaluating the spectra recorded by the at least one detector of the first partial beam that has passed through the at least one etalon n times and of the second partial beam that has passed through the at least one etalon (n+k) times to determine a light spectrum corrected for an apparatus function of the at least one etalon, wherein the at least one etalon comprises a pair of opposing exterior surfaces, and wherein passing through the at least one etalon comprises entering the etalon through one of the exterior surfaces of the pair exterior surfaces and emerging from the etalon through the other exterior surface of the pair of exterior surfaces, and wherein a beam splitter is arranged downstream of the at least one etalon as viewed from the narrowband light source so that the light beam passes through the at least one etalon before being split by the beam splitter into the first partial beam and the second partial beam, and the second partial beam is directed back through the at least one etalon.

2. The method of claim 1, wherein k=1.

3. The method of claim 1, wherein n=1.

4. The method of claim 1, wherein the light beam is collimated before it is directed through the at least one etalon.

5. The method of claim 1, wherein the at least one light-sensitive detector is one detector, and the first and second partial beams are directed onto the one detector.

6. The method of claim 5, wherein the first partial beam and the second partial beam are directed onto different regions of a detector area of the one detector.

7. The method of claim 6, wherein the detector area has a first direction and a second direction, the first and second partial beams are offset with respect to one another in the first direction, and the first and second partial beams are not offset with respect to one another in the second direction.

8. The method of claim 1, wherein the at least one etalon has a wedge error such that a spectral range of at least twice the free spectral range appears on the detector area.

9. The method of claim 1, wherein the at least one etalon comprises two plane plates or wedge plates.

10. The method of claim 1, wherein the light beam is directed through at least two etalons, and each of the at least two etalons comprises a wedge.

11. The method of claim 10, wherein the wedges are oriented with wedge directions offset by 90° with respect to one another.

12. The method of claim 1, wherein evaluating the spectra of the first partial beam and of the second partial beam comprises:

convolving a spectrum of the first partial beam with the (k+1)-th power of a test function approximately describing the apparatus function of the at least one etalon;

convolving a spectrum of the second partial beam with the same test function; and minimizing a mean square deviation between the resultant convolution products by changing at least one free parameter of the test function.

13. The method of claim 12, wherein the process of changing the at least one free parameter comprises iteratively changing the at least one free parameter in a plurality of evaluation cycles.

14. The method of claim 12, wherein the test function is determined before adjusting the at least one free parameter on the basis of the evaluation of known spectra having a different line width but the same central wavelength.

15. A spectrometer, comprising:

at least one etalon;

a beam splitter configured to split a light beam emitted by a narrowband light source into a first partial beam and a second partial beam;

one or more optical directing elements configured to direct the first partial beam n times through the at least one etalon and configured to direct the second partial beam (n+k) times through the at least one etalon, n and k being integers 1;

at least one light-sensitive detector;

an evaluation device configured to evaluate spectra recorded by the at least one detector of the first partial beam that has passed through the at least one etalon n times and of the second partial beam that has passed through the at least one etalon (n+k) times to determine a light spectrum corrected for an apparatus function of the at least one etalon, wherein the at least one etalon comprises a pair of opposing exterior surfaces, and wherein passing through the at least one etalon comprises entering the etalon through one of the exterior surfaces of the pair exterior surfaces and emerging from the etalon through the other exterior surface of the pair of exterior surfaces, and wherein the beam splitter is arranged downstream of the at least one etalon as viewed from the narrowband light source, and the at least one directing element is a directing-back element configured to direct the second partial beam back through the at least one etalon.

16. The spectrometer arrangement of claim 15, wherein k=1.

17. The spectrometer arrangement of claim 15, wherein n=1.

18. The spectrometer arrangement of claim 15, further comprising a collimator configured to collimate the light beam.

19. The spectrometer arrangement of claim 15, wherein the at least one detector is one detector, and the one detector is configured so that the first and the second partial beam are directed onto the one detector during use of the spectrometer.

20. The spectrometer arrangement of claim 19, further comprising a first beam expanding element in the beam path of the second partial beam and a second beam expanding element in the beam path of the first partial beam, to direct the first and second partial beams onto a detector area of the detector with the same extent in one dimension of said detector area.

21. The spectrometer arrangement of claim 15, wherein the beam splitter and the one or more optical directing elements are jointly in the form of a partly transmissive mirror.

22. The spectrometer arrangement of claim 21, wherein the partly transmissive mirror is oriented in relation to the at least one etalon so that the first and second partial beams pass through the at least one etalon in at least approximately complete superimposition with respect to one another.

23. The spectrometer arrangement of claim 15, wherein the at least one etalon is slightly tilted in relation to the light beam.

24. The spectrometer arrangement of claim 15, wherein the at least one etalon has a wedge error, such that a spectral range of at least twice the free spectral range appears on the detector.

25. The spectrometer arrangement of claim 15, wherein the at least one etalon is comprises two plane plates.

26. The spectrometer arrangement of claim 15, wherein at least two etalons are each constructed from a wedge.

27. The spectrometer arrangement of claim 26, wherein the two wedges are oriented with wedge directions offset by 90° with respect to one another.

* * * * *

UNITED STATES PATENT AND TRADEMARK OFFICE
CERTIFICATE OF CORRECTION

PATENT NO. : 8,289,520 B2  
APPLICATION NO. : 12/558874  
DATED : October 16, 2012  
INVENTOR(S) : Johannes Kraus et al.

Page 1 of 1

It is certified that error appears in the above-identified patent and that said Letters Patent is hereby corrected as shown below:

In the Specifications

Column 1, line 10, delete "applications" insert --application--;

Column 1, line 22, delete "band-width" insert --bandwidth--;

Column 4, line 9, after "tuning" insert --.--;

Column 5, line 44, delete "narrow-band" insert --narrowband--;

Column 5, line 47, delete "narrow-band" insert --narrowband--;

Column 6, line 47, delete "A beam expanding element" insert --Beam expanding elements--;

Column 7, lines 65-67; Column 8, lines 1-6, delete "Since the apparatus function. . .be altered." insert same as new paragraph at Column 7, line 66;

Column 8, line 46, delete "a '" insert --a'--;

Column 9, line 14, delete "element" insert --elements--;

Column 9, line 17, delete "etalon" insert --etalons--;

Column 9, line 66, delete "plate" insert --plates--;

In the Claims

Column 12, line 28, Claim 15, delete "integers 1" insert --integers $\geq$ 1--;

Column 12, line 59, Claim 19, delete "beam" insert --beams--.

Signed and Sealed this  
Sixteenth Day of April, 2013

Teresa Stanek Rea  
*Acting Director of the United States Patent and Trademark Office*